(12) United States Patent
Pickard et al.

(10) Patent No.: US 12,518,318 B1
(45) Date of Patent: Jan. 6, 2026

(54) SYSTEM AND METHOD FOR ENHANCING USER EXPERIENCE OF USER OF COMPUTING APPLICATION

(71) Applicant: Trayport Limited, London (GB)

(72) Inventors: Elliott Pickard, London (GB); Stephen Marcantonio, London (GB); Michael Alexander Cowley, London (GB)

( * ) Notice: Subject to any disclaimer, the term of this patent is extended or adjusted under 35 U.S.C. 154(b) by 0 days.

(21) Appl. No.: 19/237,295

(22) Filed: Jun. 13, 2025

(51) Int. Cl.
    *G06Q 40/04* (2012.01)
    *G06F 40/30* (2020.01)

(52) U.S. Cl.
    CPC ............. *G06Q 40/04* (2013.01); *G06F 40/30* (2020.01)

(58) Field of Classification Search
    CPC ................................. G06Q 40/04; G06F 40/30
    See application file for complete search history.

(56) References Cited

U.S. PATENT DOCUMENTS

| | | | |
|---|---|---|---|
| 12,348,545 B1 * | 7/2025 | Parikh | H04L 63/10 |
| 2017/0278181 A1 * | 9/2017 | Shah | G06Q 40/00 |
| 2022/0237700 A1 * | 7/2022 | Sreenivasan | G06F 3/0488 |
| 2024/0039873 A1 * | 2/2024 | Durairaj | H04L 51/02 |
| 2024/0403420 A1 * | 12/2024 | Lal | G06F 21/566 |
| 2025/0110957 A1 * | 4/2025 | Baldua | G06F 16/2425 |
| 2025/0245030 A1 * | 7/2025 | Cyjon | G06F 8/71 |

FOREIGN PATENT DOCUMENTS

| | | | | |
|---|---|---|---|---|
| CN | 118708676 A | * | 9/2024 | ............ G06F 18/22 |
| CN | 1187086676 A | * | 9/2024 | ............ G06F 18/22 |
| WO | WO-2018034930 A1 | * | 2/2018 | ............ G06F 16/951 |
| WO | WO-2022090982 A1 | * | 5/2022 | ............ G06Q 40/04 |
| WO | WO-2024249989 A1 | * | 12/2024 | ............ G06N 20/00 |

OTHER PUBLICATIONS

Kalpana et al.: Legal Solutions—Intelligent Chabot using Machine Learning, 2023, Intelligent Computing and Control for Engineering and Business Systems (ICCEBS), pp. 1-6 (Year: 2023).*
Wang et al.: Understanding User Experience in Large Language Model Interactions, Jan. 16, 2024, ACM, pp. 1-20 (Year: 2024).*
Moradizeyveh, Sahar: Intent Recognition in Conversational Recommender Systems, Dec. 6, 2022, pp. 1-40 (Year: 2022).*
Cao, L: AI in Finance: Challenges, Technologies and Opportunities, 2021, pp. 1-40 (Year: 2021).*

* cited by examiner

Primary Examiner — Bijendra K Shrestha
(74) Attorney, Agent, or Firm — RC Trademark Company

(57) ABSTRACT

Disclosed is system for enhancing the user experience of a user of a computing application associated with financial activities, the system comprising a processing arrangement configured to associate the user with a user category; obtain a user query, via an artificial intelligence (AI) chat interface, based on interactions of the user with at least one of: at least one another user of the computing application, the AI chat interface; process the user query, via a Large Language Model (LLM), to determine an intent of the user; identify at least one executable task associated with the computing application, based on the determined intent and the user category of the user; and execute at least one executable task associated with the computing application.

6 Claims, 2 Drawing Sheets

SYSTEM AND METHOD FOR ENHANCING USER EXPERIENCE OF USER OF COMPUTING APPLICATION

TECHNICAL FIELD

The present disclosure relates to systems and methods for enhancing the user experience of using computing applications associated with financial activities.

BACKGROUND

Existing trading systems are often characterized by significant complexity, making them difficult to navigate and operate, particularly for users without technical expertise. The complexity in existing trading systems frequently results in errors, delays, and reduced trading efficiency, particularly in today's fast-paced financial markets. Additionally, users struggle to access critical trading information promptly, often relying on lengthy manuals or cumbersome guides. The inefficiencies in the existing trading systems severely impact decision-making speed and accuracy.

Moreover, many users lack the programming skills necessary to develop and implement advanced trading strategies on the existing trading systems. Such present trading systems do not provide intuitive tools that allow users to describe complex strategies in everyday language, thereby limiting their ability to engage in sophisticated trading activities. The users must often manage multiple real-time conversations with other users while processing a constant influx of updates, leading to information overload and increased risk of missing critical details. These interactions frequently take place through unstructured chats, making it difficult to capture and act on valuable intents. Additionally, the users often face challenges in seamlessly switching between applications, which further reduces efficiency and complicates workflows. Furthermore, security and permission management also presents critical challenges to the existing trading systems, wherein the protection of sensitive information is paramount.

Therefore, in light of the foregoing discussion, there exists a need to overcome the aforementioned drawbacks.

SUMMARY

The aim of the present disclosure is to provide a system and a method to simplify interactions, enhance communication, and improve data accessibility in trading. The aim of the present disclosure is achieved by a system and a method for enhancing the user experience of a user of a computing application associated with financial activities, as defined in the appended independent claims to which reference is made. Advantageous features are set out in the appended dependent claims.

Throughout the description and claims of this specification, the words "comprise", "include", "have", and "contain" and variations of these words, for example "comprising" and "comprises", mean "including but not limited to", and do not exclude other components, items, integers or steps not explicitly disclosed to also be present. Moreover, the singular encompasses the plural, unless context specifies or implies otherwise. In particular, where an indefinite article is used, the specification is to be understood as contemplating plurality as well as singularity, unless context specifies or implies otherwise.

DETAILED DESCRIPTION OF EMBODIMENTS

Figure 1:
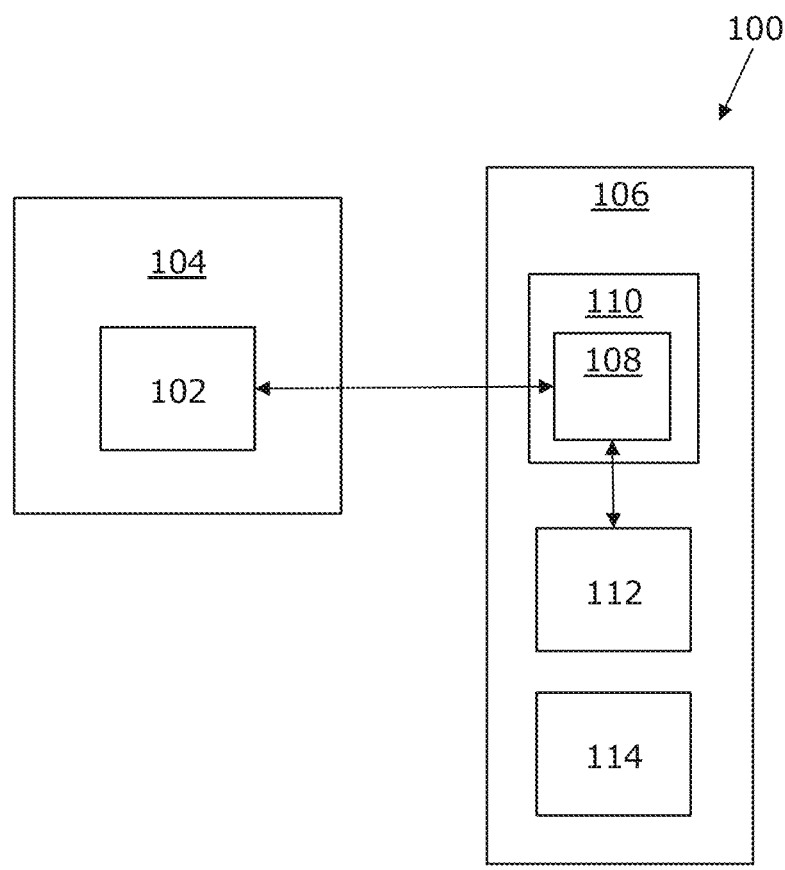
FIG. 1 is an illustration of a system for enhancing the user experience of a user of a computing application associated with financial activities, in accordance with an embodiment of the present disclosure.

The following detailed description illustrates embodiments of the present disclosure and ways in which they can be implemented. Although some modes of carrying out the present disclosure have been disclosed, those skilled in the art would recognize that other embodiments for carrying out or practising the present disclosure are also possible.

In a first aspect, the present disclosure provides a system for enhancing the user experience of a user of a computing application associated with financial activities, the system comprising a processing arrangement configured to:
   associate the user with a user category;
   obtain a user query, via an artificial intelligence (AI) chat interface, based on interactions of the user with at least one of: at least one another user of the computing application, the AI chat interface;
   process the user query, via a Large Language Model (LLM), to determine an intent of the user;
   identify at least one executable task associated with the computing application, based on the determined intent and the user category of the user and the relevance of the executable task; and prompt the user via a dialog to proceed to
   execute at least one executable task associated with the computing application or subject to any relevant permissions automatically execute at least one executable task associated with the computing application.

The present disclosure seeks to provide an aforementioned system that significantly enhances the user experience of the user in using the computing application. Moreover, the use of the LLM to process the user query enables the system to accurately determine the intent of the user. Furthermore, accurately determining the intent of the user enables the system to effectively identify at least one executable task to be executed in an automated manner. Furthermore, the execution of at least one executable task in the automated manner reduces the time and effort required of the user, making the interaction of the user with the computing application less cumbersome. Furthermore, the system enables the user to make informed decision-making based on the suggestions provided by the system and handle large amounts of data from various sources in parallel.

In a second aspect, the present disclosure provides a method for enhancing the user experience of a user of a computing application associated with financial activities, the method comprising:
   associating the user with a user category;
   obtaining a user query, via an artificial intelligence (AI) chat interface, based on the interactions of the user with at least one of: at least one another user of the computing application, the AI chat interface;
   processing the user query, via a Large Language Model (LLM), to determine the intent of the user;
   identifying at least one executable task associated with the computing application, based on the determined intent and the user category of the user; and
   executing at least one executable task associated with the computing application.

The present disclosure seeks to provide an aforementioned method that significantly enhances the user experience of the user in using the computing application. Moreover, the use of the LLM for processing the user query enables the method and system to accurately determine the intention of the user. Furthermore, accurately determining the intent of the user enables the method to effectively identify at least one executable task to be executed in an automated manner. Furthermore, the execution of at least one executable task in the automated manner reduces the time and effort required of the user, making the interaction of the user with the computing application less cumbersome. Furthermore, the method enables the user to make informed decision-making based on the suggestions provided by the method and handle large amounts of data from various sources in parallel.

Throughout the present disclosure, the term "computing application" refers to a software application that is designed to perform specific tasks and solve particular problems using computational resources on a computing device (such as a computer, a laptop, a mobile phone, a tablet, and the like). Throughout the present disclosure, the term "financial activities" refers to specific tasks that are related to financial markets and trading. Such examples of financial activities include, but are not limited to, the buying and selling of stocks, trading currencies, trading commodities (e.g., gold, silver, and the like), dealing or trading in commodities, portfolio analysis, ETF's, indices, benchmarks, origination, carbon, swaps and futures trading, and buying and selling cryptocurrencies and all derivatives of these. Notably, the computing application being associated with the financial markets implies that the computing application is designed to perform the specific tasks related to financial markets and trading, using computational resources. Throughout the present disclosure, the term "user" refers to a person or an organization that is using the computing application. Throughout the present disclosure, the term "user experience" refers to the overall experience of the user while operating and interacting with the computing application.

Throughout the present disclosure, the term "processing arrangement" refers to a computational element that is operable to execute the instructions of the system. Examples of the processing arrangement include, but are not limited to, a microprocessor, a microcontroller, a complex instruction set computing (CISC) microprocessor, a reduced instruction set (RISC) microprocessor, a very long instruction word (VLIW) microprocessor, or any other type of processing circuit. Furthermore, the processing arrangement may refer to one or more individual processors, processing devices and various elements associated with a processing device that may be shared by other processing devices. Additionally, one or more individual processors, processing devices and elements are arranged in various architectures for responding to and processing the instructions that execute the instructions of the system.

Throughout the present disclosure, the term "user category" refers to a classification associated with the user that enables the identification of the purpose and the role of the user in using the computing application. For example, the user category is one of: a trader, a broker. The user is associated with the user category by classifying the user into the user category that matches the purpose and the role of the user in using the computing application. Notably, the user being associated with the user category enables the processing arrangement to make more informed, suitable and role-specific decisions for the user based on the user category of the user.

Throughout the present disclosure, the term "interactions of the user" refers to the communication of a user of the computing application with at least one other user that is also using the computing application, and/or with the artificial intelligence (AI) chat interface. Optionally, the interactions of the user are related to one or more of: performing financial activities on the computing application, planning out future financial activities, monitoring updates in financial entities on the computing application. Throughout the present disclosure, the term "another user" refers to another person or another organization that is using the computing application. It will be appreciated that the "at least another user" refers to "one other user" in some implementations, and "a plurality of other users" in other implementations. Throughout the present disclosure, the term "artificial intelligence (AI) chat interface" refers to a software interface designed to facilitate interaction between the user and the computing application through natural language conversations. The AI chat interface allows the user to communicate with an AI system powered by natural language processing (NLP) and machine learning to provide context-aware responses to the user. Throughout the present disclosure, the term "user query" refers to a prompt that is obtained from monitoring the interactions of the user with at least one other user and/or the AI chat interface. Notably, the user query is obtained by the processing arrangement using the AI chat interface which monitors the interactions of the user with the AI chat interface itself and/or at least one other user of the computing application.

Throughout the present disclosure, the term "Large Language Model (LLM)" refers to an advanced artificial intelligence system designed to understand and generate human-like text by processing and analyzing natural language. The LLM is built using deep learning techniques, particularly neural networks, and is trained on vast amounts of text data to perform a wide range of language-related tasks. Notably, the user query being processed via the LLM enables the processing arrangement to analyze and understand the context of the interactions of the user with the user query at a deeper level and with more accuracy, due to the efficiency of the LLM in understanding human language. Optionally, to process the user query, the LLM identifies key words or phrases in the user query that explains the context of the interactions of the user in the user query with more ease and accuracy. Throughout the present disclosure, the term "intent of the user" refers to the purpose or goal of the user related to the interactions of the user with the user query. Notably, the user query being processed via the LLM to determine the intent of the user implies that the context of the interactions of the user is understood by the LLM by processing the user query, and is used by the LLM to determine what the purpose or goal of the user is based on the interactions of the user (i.e., the intent of the user). For example, the intent of the user could be to perform any financial activity on the computing application, monitor real time updates in the financial entities on the computing application from multiple interactions, and the like.

Optionally, the processing arrangement is further configured to provide an alert message to the user via the AI chat interface based on the detection of at least one anomaly in the processed user query. In this regard, the term "anomaly" refers to an unexpected, irregular, or unusual pattern in the interactions of the user with the processed user query that deviates from typical or expected behaviour. It will be appreciated that "at least one anomaly" refers to "one anomaly" in some implementations, and "a plurality of anomalies" in other implementations. At least one anomaly may indicate errors, inconsistencies, or special cases that require additional attention or handling from the user. Throughout the present disclosure, the term "alert message" refers to a message provided to the user with the purpose of alerting the user about when at least one anomaly is detected in the processed user query. A technical effect is that the user is alerted timely about at least one anomaly being detected in the processed user query.

Throughout the present disclosure, the term "executable task" refers to a specific task or action that is performed by the processing arrangement on the computing application in an automated manner. It will be appreciated that "at least one executable task" refers to "one executable task" in some implementations, and "a plurality of executable tasks" in other implementations. Notably, at least one executable task being identified based on the determined intent and the user category of the user implies that the processing arrangement has identified one or more specific tasks suitable for the user based on the determined user category of the user, that are to be executed on the computing application to fulfill the determined intent of the user. Furthermore, there may be periods where there is no current executable task due to the LLM deciding that not executing an executable task would create a more favourable conversation. In other aspects, the LLM may decide not to execute an executable task at a specific moment in time, but decide to interject later when the timing is more favourable.

Optionally, at least one executable task associated with the computing application is at least one of:
  generating at least one executable programming code to implement at least one trading strategy, based on the processed user query, when the determined intent of the user is indicative of creating at least one trading strategy to be implemented for the user on the computing application;
  accumulating real-time updates in the computing application from the interactions of the user with a plurality of other users of the computing application, via the AI chat interface, when the determined intent of the user is indicative of monitoring the real-time updates in the computing application;
  generating analysis of the historical performance of the user and at least one financial entity in the computing application, wherein data associated with the historical performance of the user and at least one financial entity is retrieved from a database communicably coupled with the processing arrangement, when the determined intent of the user is indicative of analyzing the historical performance of the user and at least one financial entity;
  generating recommendations for the user, using the LLM, based on the historical performance of the user and at least one financial entity in the computing application, when the determined intent of the user is indicative of requiring assistance in decision-making on the computing application;
  initiating at least one type of financial activity on the computing application, when the determined intent of the user is indicative of performing at least one type of financial activity on the computing application;
  seeking out and displaying relevant ancillary information or electronic documentation relating to the ongoing chat.

In this regard, the term "trading strategy" refers to a systematic plan of how and when to perform one or more specific financial activities on the computing application. It will be appreciated that "at least on trading strategy" refers to "one trading strategy" in some implementations, and "a plurality of trading strategies" in other implementations. At least one trading strategy indicates certain conditions under when one or more specific financial activities are to be performed. Moreover, the determined intent of the user being indicative of creating at least one trading strategy implies that the interactions of the user with the user query indicates that the purpose of the user is to create at least one trading strategy to be implemented on the computing application. Notably, to implement at least one trading strategy on the computing application, at least one trading strategy needs to be represented in a computer readable format that is interpretable and executable by the processing arrangement. Throughout the present disclosure, the term "executable programmable code" refers to an algorithmic representation of the trading strategy in a computer readable format that is interpretable and executable by the processing arrangement. It will be appreciated that "at least one executable programming code" refers to "one executable programming code" in some implementations, and "a plurality of executable programming codes" in other implementations. Notably, each executable programming code from amongst at least one executable programming code is generated for a corresponding trading strategy from amongst at least one trading strategy. At least one executable programming code being generated, based on the processed user query, implies that the processed user query is being used by the processing arrangement to determine which trading strategy the user wants implemented on the computing application. This is based on the interactions of the user with the user query, and subsequently, at least one executable programming code is generated. It will be appreciated that generating at least one executable programming code to implement at least one trading strategy, being at least one executable task, when the determined intent of the user is indicative of creating at least one trading strategy, enables the removal of the need for the user to manually generate at least one executable programming to implement at least one strategy. For example, if in the user query the user states, "I want to set up a strategy to buy commodity Y when the price drops below $100 and sell when commodity Y rises above $120," the processing arrangement uses the LLM to determine the intent of the user to create the trading strategy of buying commodity Y when the price drops below $100 and selling when commodity Y rises above $120. The processing arrangement then identifies generating the executable programming code to implement the aforementioned trading strategy as at least one executable task associated with the computing application.

Throughout the present disclosure, the term "real-time updates" refers to any changes that are taking place in the financial markets or the financial entities on the computing application in real-time. Notably, at least one executable task accumulating real-time updates from the computing application from the interactions of the user with the plurality of other users of the computing application keeps track of the real-time updates from the multiple interactions of the user simultaneously in an automated manner, which significantly reduces the work load of the user. It will be appreciated that real-time updates in the computing application from the interactions of the user with the plurality of other users are accumulated using the AI chat interface. For example, the user (associated with the user category of the trader) might have interactions with 20 or more with another user (associated with the user category of brokers) at the same time. Subsequently, when the determined intent of the user is indicative of monitoring the real-time updates of the computing application, then at least one executable task is identified to be accumulating the real-time updates in the computing application from the interactions of the user with the plurality of other users, using the AI chat interface. It will also be appreciated that "real-time updates" result in executable tasks, without having to wait for a user's input. A conversation may have moved on, however the LLM keeps up with info relevant to the context of the discussion to execute as executable tasks later.

Throughout the present disclosure, the term "historical performance of the user" refers to the performance of the user with the computing application in the past over a specific period of time. For example, the historical performance of the user includes the performance of the user with the computing application over the last two years. Throughout the present disclosure, the term "financial entity" refers to a commodity that is traded on the computing application. For example, the financial entity could be stocks, currencies, cryptocurrencies, gold, silver, and the like. It will be appreciated that "at least one financial entity" refers to "one financial entity" in some implementations, and "a plurality of financial entities" in other implementations. Throughout the present disclosure, the term "historical performance of at least one financial entity" refers to the performance of at least one financial entity in the computing application in the past over a specific period of time. For example, the historical performance of at least one financial entity includes the performance of at least one financial entity in the computing application over the last one year. Throughout the present disclosure, the term "analysis of historical performance of the user and at least one financial entity" refers to an evaluation of the historical performance of the user and at least one financial entity to identify trends, patterns, and areas of interest from the historical performance of the user and at least one financial entity.

Throughout the present disclosure, the term "database" refers to a structured collection of data stored in a computing device or a cloud based server from where the data associated with the historical performance of the user and at least one financial entity is retrieved. Optionally, the database is communicably coupled with the processing arrangement using at least one of: a Wi-Fi interface, a bluetooth interface, a cellular interface, and the like. Notably, at least one executable task generates the analysis of the historical performance of the user and at least one financial entity in the computing application, when the determined intent of the user is indicative of analyzing the historical performance of the user and at least one financial entity. This enables the reduction of the required time and effort of the user in manually analyzing large amounts of data associated with the historical performance of the user and at least one financial entity. For example, in the user query, if the user states "What is the performance of Contract A over the last six months?", then the user query is processed by the LLM to understand the key terms ("performance," "Contract A," and "six months"), and the intent of the user is determined to be indicative of analyzing the historical performance of Contract A over the last six months. Subsequently, the processing arrangement retrieves the data associated with the historical performance of Contract A from the database, and at least one executable task is identified to analyze the historical performance of Contract A over the last six months.

Optionally, the generated analysis of the historical performance of the user and at least one financial entity in the computing application, is represented in the form of at least one of: tables, graphs. A technical effect of the generated analysis being represented in at least one of the aforementioned forms is that the generated analysis is easily interpretable for the user to gain quick insights from the generated analysis.

Throughout the present disclosure, the term "recommendations" refers to suggested options provided to the user for communication or performing any type of financial activity on the computing application, based on the historical performance of the user and at least one financial entity in the computing application. Notably, when the determined intent of the user indicates requiring assistance in the decision-making of the computing application, this implies that the user wants to use computational resources of the LLM to suggest what suitable actions to be taken are, based on the historical performance of the user and at least one financial entity. Subsequently, at least one executable task generating the recommendations for the user using the LLM enables the user to make improved decisions based on the generated recommendations.

Notably, if the determined intent of the user indicates performing at least one type of financial activity on the computing application, this implies that during the interactions of the user, the user has enquired about performing at least one type of financial activity. Subsequently, at least one executable task initiating at least one type of financial activity on the computing application, when the determined intent of the user is indicative of performing at least one type of financial activity, enables the processing arrangement to initiate at least one type of financial activity in an automated manner, thus saving the user's time and effort.

Optionally, the processing arrangement updates the user about initiating at least one type of financial activity, using the AI chat interface. For example, if the user (associated with the user category of the trader) states "place an order to sell 100 units of Commodity X" in the user query, then the intent of the user is determined to be indicative of selling 100 units of the Commodity X. The identified executable task is subsequently initiating the sale of 100 units of Commodity X. A technical effect of the executable tasks being at least one of the aforementioned tasks is that a wide range of automated services across different applications can be provided to the user, which significantly enhances the user's experience.

Optionally, the processing arrangement is further configured to:
 compare at least one executable task with a set of protocols;
 determine if each protocol from amongst the set of protocols is violated by at least one executable task; and
 when it is determined that each protocol from amongst the set of protocols is not violated by at least one executable task, execute at least one executable task associated with the computing application.

In this regard, the term "set of protocols" refers to a set of rules and regulations that are to be complied with for performing any task or function on the computing application. Notably, the set of protocols are associated with the privacy and data protection policy of the computing application to safeguard the data privacy of the users of the computing application. Herein, at least one executable task is compared with the set of protocols by checking if the executable tasks complies with each protocol from amongst the set of protocols or not. Subsequently, determining whether each protocol from amongst the set of protocols is being violated by at least one executable task determines if and which specific protocol from amongst the set of protocols is being violated by the relevant executable tasks. Moreover, when it is determined that each protocol from amongst the set of protocols is not violated by at least one executable task, it is ensured that at least one executable task is executed only when the executable task complies with all required rules and regulations. A technical effect is that the executable tasks are effectively checked if they are complying with the required rules and regulations of the computing application, prior to their execution.

Notably, at least one executable task associated with the computing application is executed in an automated manner by the processing arrangement, which saves time, increases efficiency and reduces the workload of the user, thereby enhancing the user experience of the user in using the computing application.

The present disclosure also relates to the method as described above. Various embodiments and variants disclosed above, with respect to the aforementioned system, apply mutatis mutandis to the method.

Optionally, at least one executable task associated with the computing application is at least one of:
- generating at least one executable programming code to implement at least one trading strategy, based on the processed the user query, when the determined intent of the user is indicative of creating at least one trading strategy to be implemented for the user on the computing application;
- accumulating real-time updates in the computing application from the interactions of the user with a plurality of other users of the computing application, via the AI chat interface, when the determined intent of the user is indicative of monitoring the real-time updates of the computing application;
- generating analysis of historical performance of the user and at least one financial entity in the computing application, wherein data associated with the historical performance of the user and at least one financial entity is retrieved from a database, when the determined intent of the user is indicative of analyzing the historical performance of the user and at least one financial entity;
- generating recommendations for the user, based on the historical performance of the user and at least one financial entity in the computing application, when the determined intent of the user is indicative of requiring assistance in decision-making with the computing application;
- initiating at least one type of financial activity on the computing application, when the determined intent of the user is indicative of performing at least one type of financial activity on the computing application.

Optionally, the generated analysis of the historical performance of the user and at least one financial entity in the computing application, is represented in form of at least one of: tables, graphs.

Optionally, the method further comprises:
- comparing at least one executable task with a set of protocols;
- determining if each protocol from amongst the set of protocols is violated by at least one executable task; and
- when it is determined that each protocol from amongst the set of protocols is not violated by at least one executable task, executing at least one executable task associated with the computing application.

Optionally, the method further comprises providing an alert message to the user, via the AI chat interface, based on the detection of at least one anomaly in the processed user query.

DETAILED DESCRIPTION OF THE DRAWINGS

Referring to FIG. 1, illustrated is a system 100 for enhancing the user experience of a user 102 of a computing application 104 associated with financial activities, in accordance with an embodiment of the present disclosure. As shown, the system 100, comprising a processing arrangement 106, is configured to associate the user 102 with a user category. Moreover, the processing arrangement 106 is configured to obtain a user query 108, via an artificial intelligence (AI) chat interface 110, based on the interactions of the user 102 with at least one of: at least one other user of the computing application 104, the AI chat interface 110. Furthermore, the processing arrangement 106 is configured to process the user query 108 via a Large Language Model (LLM) 112 to determine the intent of the user 102. Furthermore, the processing arrangement 106 is configured to identify at least one executable task (depicted as an executable task 114) associated with the computing application 104, based on the determined intent and the user category of the user 102. Furthermore, the processing arrangement 106 is configured to execute at least one executable task 114 associated with the computing application 104.

FIG. 1 is merely an example, which should not unduly limit the scope of the claims herein. A person skilled in the art will recognize many variations, alternatives, and modifications of embodiments of the present disclosure.

Figure 2:
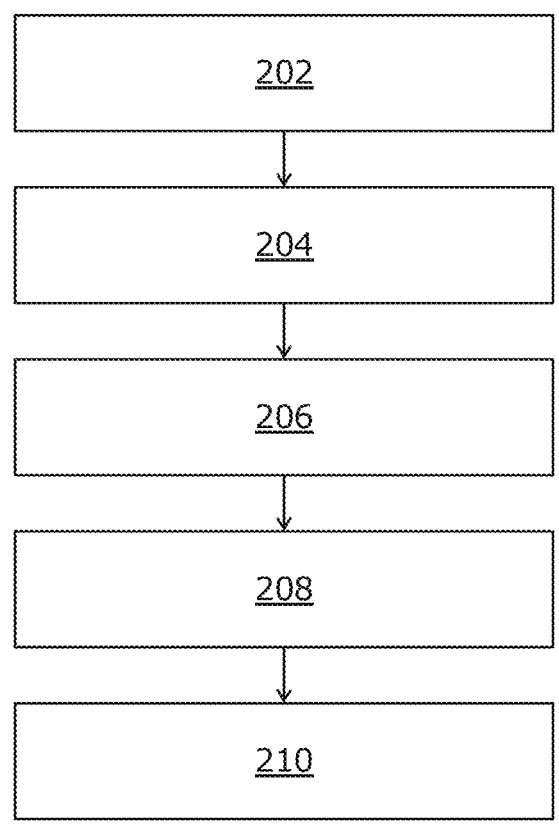
FIG. 2 is an illustration of a method for enhancing the user experience of a user of a computing application associated with financial activities, in accordance with an embodiment of the present disclosure.

Referring to FIG. 2, illustrated is a method for enhancing the user experience of a user of a computing application associated with financial activities, the method comprising in accordance with an embodiment of the present disclosure. At step 202, the user is associated with a user category. At step 204, a user query is obtained via an artificial intelligence (AI) chat interface based on the interactions of the user with at least one of: at least one other user of the computing application, the AI chat interface. At step 206, the user query is processed via a Large Language Model (LLM) to determine the intent of the user. At step 208, at least one executable task associated with the computing application is identified, based on the determined intent and the user category of the user. At step 210, at least one executable task associated with the computing application is executed.

The aforementioned steps are only illustrative and other alternatives can also be provided where one or more steps are added, one or more steps are removed, or one or more steps are provided in a different sequence without departing from the scope of the claims herein.

The invention claimed is:

1. A system for enhancing the user experience for a user of a computing application associated with financial activities, the system comprising a processing arrangement configured to:
   associate the user with a user category;
   obtain a user query, via an artificial intelligence (AI) chat interface, based on the interactions of the user with at least one of: at least one other user of the computing application, the AI chat interface;
   process the user query, via a Large Language Model (LLM), to determine the intent of the user;
   identify at least one executable task associated with the computing application, based on the determined intent and the user category of the user; and wherein at least one executable task associated with the computing application comprises:
generating at least one executable programming code to implement at least one trading strategy, based on the processed user query, when the determined intent of the user is indicative of creating at least one trading strategy to be implemented for the user of the computing application;
accumulating real-time updates in the computing application from the interactions of the user with a plurality of other users of the computing application, via the AI chat interface, when the determined intent of the user is indicative of monitoring the real-time updates in the computing application;
generating analysis of the historical performance of the user and at least one financial entity in the computing application, wherein data associated with the historical performance of the user and at least one financial entity is retrieved from a database communicably coupled with the processing arrangement, when the determined intent of the user is indicative of analyzing the historical performance of the user and at least one financial entity;
generating recommendations for the user, using the LLM, based on the historical performance of the user and at least one financial entity in the computing application, when the determined intent of the user is indicative of requiring assistance in decision-making on the computing application; and
initiating at least one type of financial activity on the computing application, when the determined intent of the user is indicative of performing at least one type of financial activity on the computing application,
wherein the processing arrangement is further configured to:
compare at least one executable task with a set of protocols;
determine if each protocol from amongst the set of protocols is violated by at least one executable task; and
when it is determined that each protocol from amongst the set of protocols is not violated by at least one executable task, execute at least one executable task associated with the computing application.

2. The system of claim 1, wherein the generated analysis of the historical performance of the user and at least one financial entity in the computing application is represented in form of at least one of: tables, graphs.

3. The system of claim 1, wherein the processing arrangement is further configured to provide an alert message to the user, via the AI chat interface, based on the detection of at least one anomaly in the processed user query.

4. A method for enhancing the user experience for a user of a computing application associated with financial activities, the method comprising:
associating the user with a user category;
obtaining a user query (108), via an artificial intelligence (AI) chat interface, based on the interactions of the user with at least one of: at least one other user of the computing application, the AI chat interface;
processing the user query, via a Large Language Model (LLM), to determine the intent of the user;
identifying at least one executable task associated with the computing application, based on the determined intent and the user category of the user; and
executing at least one executable task associated with the computing application, wherein at least one executable task associated with the computing application comprises:
generating at least one executable programming code to implement at least one trading strategy, based on the processed user query, when the determined intent of the user is indicative of creating at least one trading strategy to be implemented for the user of the computing application;
accumulating real-time updates in the computing application from the interactions of the user with a plurality of other users of the computing application, via the AI chat interface, when the determined intent of the user is indicative of monitoring the real-time updates of the computing application;
generating analysis of the historical performance of the user and at least one financial entity in the computing application, wherein the data associated with the historical performance of the user and at least one financial entity is retrieved from a database, when the determined intent of the user is indicative of analyzing the historical performance of the user and at least one financial entity;
generating recommendations for the user, using the LLM, based on the historical performance of the user and at least one financial entity in the computing application, when the determined intent of the user is indicative of requiring assistance in decision-making for the computing application; and
initiating at least one financial activity on the computing application, when the determined intent of the user is indicative of performing at least one financial activity on the computing application:
comparing at least one executable task with a set of protocols;
determining if each protocol from amongst the set of protocols is violated by at least one executable task; and
when it is determined that each protocol from amongst the set of protocols is not violated by at least one executable task, executing at least one executable task associated with the computing application.

5. The method of claim 4, wherein the generated analysis of the historical performance of the user and at least one financial entity in the computing application, is represented in form of at least one of: tables, graphs.

6. The method of claim 4, wherein the method further comprises providing an alert message to the user, via the AI chat interface, based on the detection of at least one anomaly in the processed user query.

* * * * *